Nov. 24, 1936.  W. A. HARRIS  2,062,220
TIRE INFLATING AND DEFLATING APPARATUS
Filed March 26, 1931  5 Sheets-Sheet 5

WITNESSES

INVENTOR
W. A. Harris,
BY
ATTORNEY

Patented Nov. 24, 1936

2,062,220

UNITED STATES PATENT OFFICE 2,062,220

TIRE INFLATING AND DEFLATING APPARATUS

William A. Harris, Greenville, S. C.

Application March 26, 1931, Serial No. 525,564

5 Claims. (Cl. 50—12)

My invention relates to pneumatic tire inflating and deflating apparatus, and is an improvement of the form of device disclosed in my application filed July 26, 1927, Serial No. 208,612, now Patent No. 1,805,397, granted May 12, 1931.

It is an object of my invention to provide an apparatus wherein quick and accurate inflation or deflation of a tire may be accomplished by a single application of the air hose chuck to a valve stem of a tire.

A further object of the invention is to provide a tire inflating or deflating apparatus wherein an air control mechanism is actuated through the medium of air pressure, thereby positively causing a predetermined quantity of air to pass to or from a tire.

A still further object of the invention is to provide an inflating and deflating apparatus having pneumatically operated signal means operable to emit an audible intermittent signal during tire inflation, and a continuous audible signal during deflating operation.

It is a still further object of the invention to provide an apparatus which when associated with a tire will inflate a tire to a predetermined pressure, if under inflated, or to deflate a tire to a predetermined pressure if over inflated.

It is a still further object of the invention to provide an apparatus which will inflate or deflate a tire to a desired pressure with great accuracy and speed and without the use of separate pressure gauges.

Additional objects, advantages and features of the invention reside in the construction, arrangement and combinations of parts as herein described, claimed and shown in the accompanying drawings, wherein

Reference is first made to Figs. 1, 2, 3 and 4 of the drawings. In carrying out my invention I make use of any well known form of base 10 constituting a reel housing 11 confining an air hose 12, to which there is attached the usual tire valve chuck 13. From the housing 11, an upstanding rectangular casing 14 is secured, and upon one face thereof there is mounted a pressure gauge 15 connected to a main air pressure tank (not shown). This gauge will indicate the air pressure within the main pressure tank, at all times.

An air control unit, generally indicated by the reference character 16 is mounted within a circular casing 17 secured in any suitable manner to the upper end of the casing 14. The casing 17 comprises an enlongated central passage 18 closed at its upper end by a partition 19, and this partition with the casing 17 defines an auxiliary air chamber 20. The chamber 20 may be constructed in accordance with the disclosure made in my pending application, Serial No. 208,612, now Patent No. 1,805,397, granted May 12, 1931.

The unit 16 is positioned within the passage 18 at its lower part, and at the upper part thereof I provide a pressure gauge 21 of any well known construction. The pressure gauge 21 is connected to the auxiliary air chamber 20 by the pipe 22 and the unit 16 is connected to the auxiliary chamber by the pipe 23 as clearly shown in Fig. 2.

Figures 1, 2, 3:
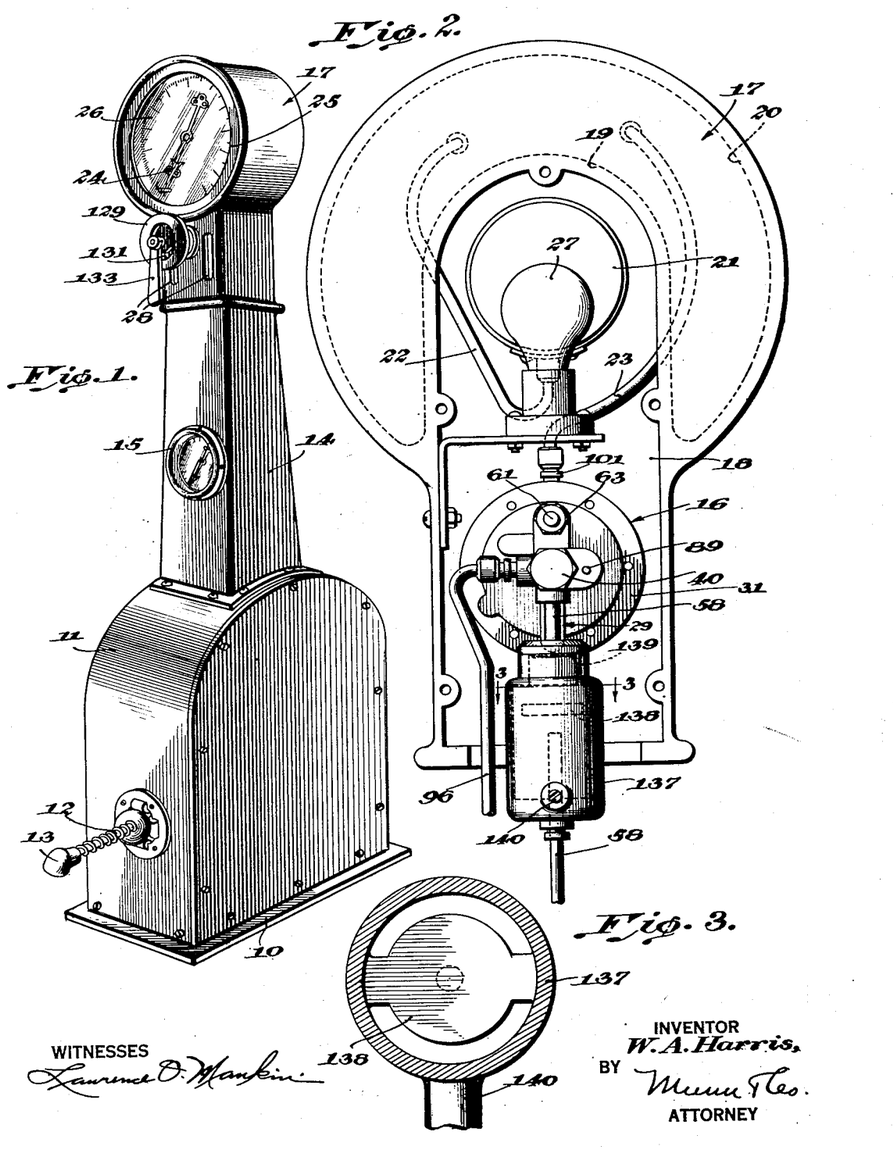
Figure 1 is a perspective view of my tire inflating and deflating apparatus.
Figure 2 is a rear elevation of the upper portion of the apparatus, with parts of the casing removed to illustrate the interior mechanism.
Figure 3 is a cross section on the line 3—3 of Fig. 2.

An indicator needle 24 is operatively associated with the gauge 21 and is readable upon the dial 25 through the dial glass 26 of the casing 17.

If found desirable, the dial 25 may be illuminated, and in the present instance, I have illustrated an incandescent lamp 27 mounted within the passage 18. The lamp may have any suitable source of energy.

The passage 18 is open to the rear of the casing 17 but may be closed by a removable plate, thus permitting ready access to the parts contained therewithin for repairs or adjustments as required.

The casing 17 is suitably apertured as at 28 to permit the exit of the audible signals from the casing.

Attention is now directed to Figs. 4, 7, 8 and 9 of the drawings for an understanding of the construction of the unit 16. The unit 16 comprises a main cylindrical body 29 and cap member 30, each of these members having flanges 31 and 32 respectively, suitably apertured for reception of screws 33 for firmly clamping the body and cap upon an interposed circular diaphragm 34.

Figures 4, 5:
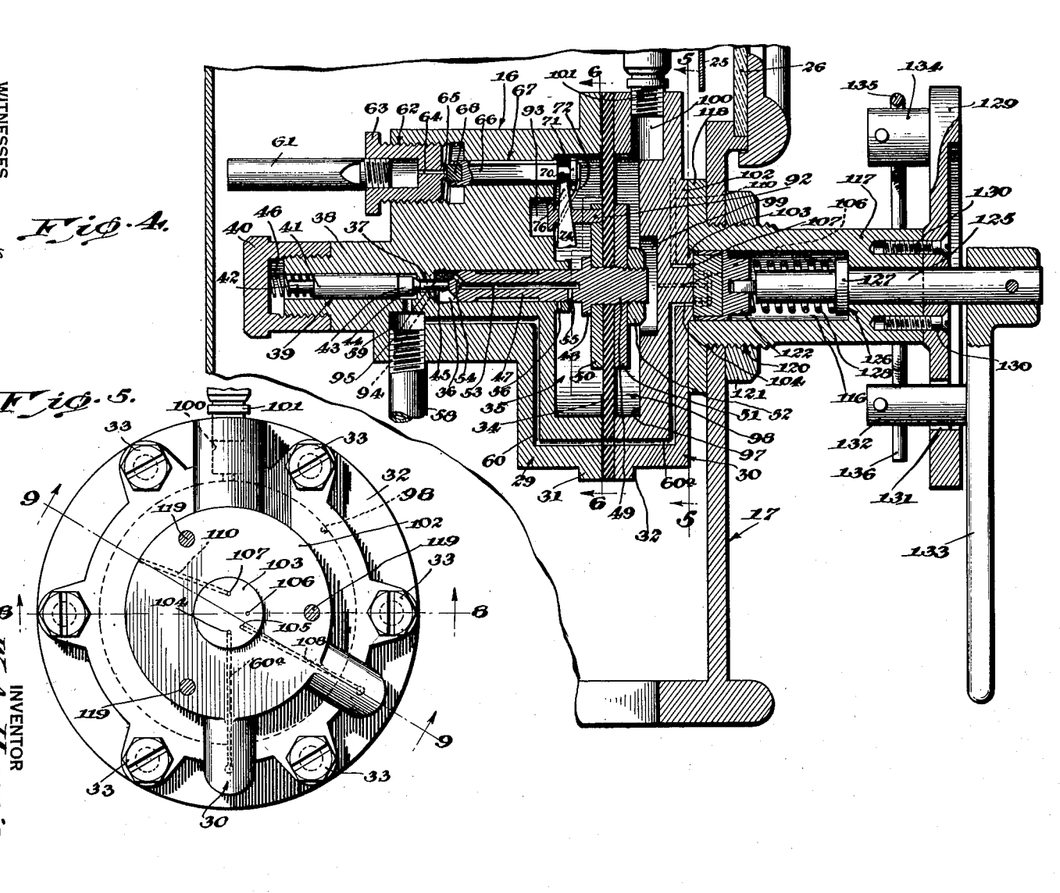
Figure 4 is a vertical section illustrating the control mechanism and manual setting means therefor.
Figure 5 is a cross section thereof on the line 5—5.

The main body 29 is formed with a circular chamber 35 extending inwardly from the planiform face of the flange 31 for a suitable distance, and in communication with this chamber there is an axial bore 36, having a reduced portion 37. The outer end of the body 29 has a boss 38, and through this boss there is a bore 39 in axial alignment with bore 36. The boss 38 is provided with external threads for securement of a cap 40 and within the bore 39 there is a plunger valve 41 having a stem portion 42. The forward end of the plunger 41 is reduced as at 43, and immediately in advance thereof, the plunger has a tapered portion 44 adapted to seat within a similar shaped seat of the bore 37. From the portion 44 the plunger is continued as a pin 45 extending through the bore 37 and projecting a short distance into the bore 36.

The plunger valve 41 is normally held seated in the bore 37, by a helical spring 46 interposed between the cap 40 and plunger 41.

Within the bore 36 there is a slide valve 47 having a concentric shoulder 48 and threaded extremity 49. The extremity 49 is inserted through an aperture formed centrally of the diaphragm 34 and reinforcing plates 50 and 51 are disposed upon opposite sides of the diaphragm. The slide valve 47 is secured to the diaphragm by a nut 52 engaged upon the threaded portion 49.

From the above description it will be apparent that as the diaphragm is flexed the valve 47 will be given a reciprocating motion, as will be explained in greater detail hereinafter.

The valve 47 has an axial port 53 in communication with a port 54 at the forward end of the valve, and a port 55 at the rear thereof opening through the side of the valve for registry with a port 56 formed in the boss 57.

An air supply conduit 58, leading from the main pressure tank is threadedly engaged in a bore 59 which opens into the bore 39 immediately adjacent the reduced portion 43 of the plunger 41. A port 60 is also in communication with the bore 59, this port extending through the body 29 as shown clearly in Fig. 4, and opens upon the flange 31 for registration with a similar port 60a formed in the cap 30, and aperture formed in the diaphragm 34.

An audible signal 61, in the present instance shown as a whistle, is mounted in a threaded bore 62 formed in the body 29. The mounting of the whistle 61 is effected by way of the threaded plug 63 engaged in the bore 62. The plug 63 is provided with a central port 64 and terminates in a seat 65.

A reciprocable whistle valve 66 is slidably mounted in a bore 67, this bore being formed so as to extend in axial alignment with the port 64 of the plug 63.

One end of the valve 66 is provided with a leather or composition valve disk 68 adapted to seat upon the seat 65, and the valve is further provided with a flat face 69 extending throughout its length, permitting passage of air therethrough to operate the whistle 61, at times.

In order to move the valve 66 into seated and unseated engagement with the seat 65 the valve has a reduced portion 70 and head 71. A flat leaf spring 72, suitably mounted upon the base of the chamber 34, as indicated at 73, is provided, the free end thereof resting upon the head 71 and exerts a pressure tending to hold the valve disk 68 against the seat 65. A trip lever 74 rockably mounted upon a fulcrum block 75 carried by the bottom wall of the chamber 34 is provided having one end 76 engaged beneath the head 71, while the other end 77 of the lever 74 is associated with a latch member now to be described.

A latch 78 reciprocably mounted in a bore 79 formed longitudinally of the body 29 and in the same horizontal plane as the valve 66, is provided, and comprises a cylindrical sleeve 80 closed at one end as at 81. The sleeve 80 has formed therein a slot 82, through which the end 77 of the lever 74 projects. Within the sleeve 80 there is a cylindrical plunger 83 having an elongated slot 84, and within said slot, a dog 85 is pivotally mounted. A flat leaf spring 86 is secured in the seat 87, and is tensioned so as to bear upon the dog and swing it so as to overlie the end 77 of the lever 74. In order to hold the latch 78 in its proper outward position, I employ a helical spring 88, which is interposed between the closed end 81 of the sleeve and the plunger 83.

Adjustment of the latch 78 longitudinally within the bore 79 is accomplished through the screw 89 threadedly engaged in the housing 29. Adjusting the screw 89 inwardly toward the diaphragm will consequently move the latch 78 in the same direction.

The dog 85 in the present instance includes a heel 90 adapted to lie in the slot 82 for cooperation with the shoulder 91, as will appear hereinafter.

A headed stud 92 is carried by the plate 50 projecting in the direction of the lever 74, the head thereof being disposed beneath the lever 74 closely adjacent the valve 66, so that motion will be transmitted to the valve 66 upon flexing action of the diaphragm. The body 29 is recessed as at 93 to accommodate rearward movement of the stud 92.

Figure 8:
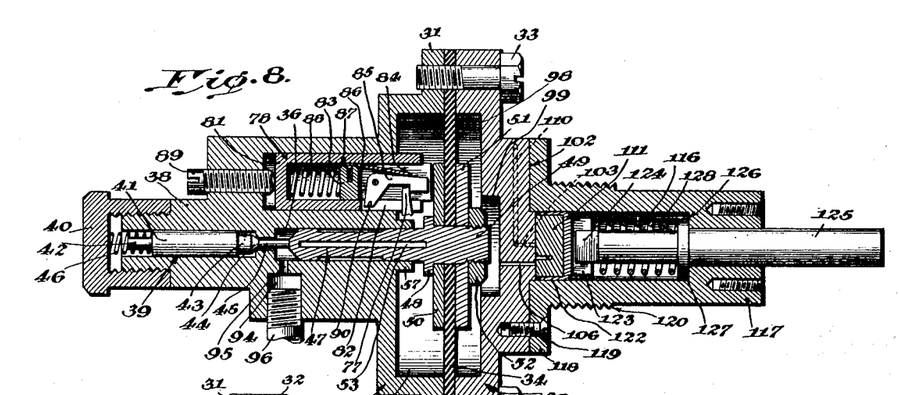
Figure 8 is a cross section on the line 8—8 of Fig. 5.

Attention is now directed to Fig. 8 wherein it will be seen that the main body 29 also includes an air port 94 which is in communication with the bore 36, through a port 95. Air for inflating a tire is discharged through the ports 94 and 95 to an air line 96 which is suitably connected to the air hose 12.

The cap member 30 as previously stated is secured to the main body 29, and is suitably recessed as at 97 which together with the diaphragm 34 forms a chamber 98. The cap 30 is also recessed as at 99 to accommodate the rearward movement of the valve 47 as will occur during operation of the apparatus.

In order to permit passage of air from the auxiliary chamber 20 to the chamber 98, an air port 100 is provided, within which the air line 23 is secured as at 101.

The cap 30 has a circular boss 102 formed concentrically therewith and also includes a valve seat 103 having air ports 104, 105, 106 and 107. The air port 104 is in communication with the air port 60a and 60; the port 105 is in communication with the chamber 35 through ports 108 and 109 (see Fig. 9); the port 106 opens directly into the chamber 97 and port 107 opens to the atmosphere through port 110.

Figure 11:
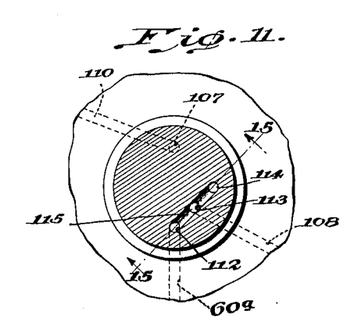
Figure 11 is a cross section through the pressure adjusting valve illustrating the position of its ports with the manual setting means moved to the left, as shown in Fig. 10.
Figure 12:
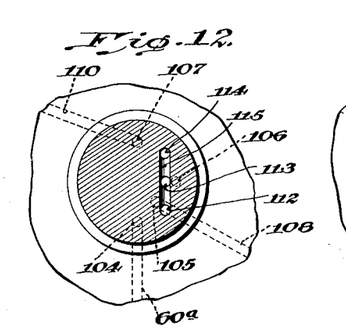
Figure 12 is a similar view illustrating the position of the ports with the setting means in neutral position.
Figure 13:
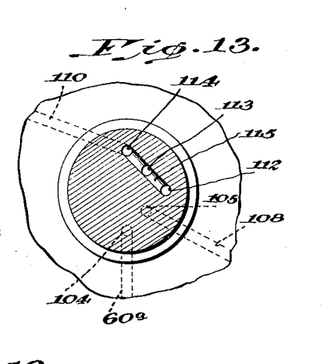
Figure 13 is a further view thereof illustrating the position of the ports when the setting means are moved to the right, as shown in Fig. 10.
Figures 14, 15, 16, 17, 18, 19:
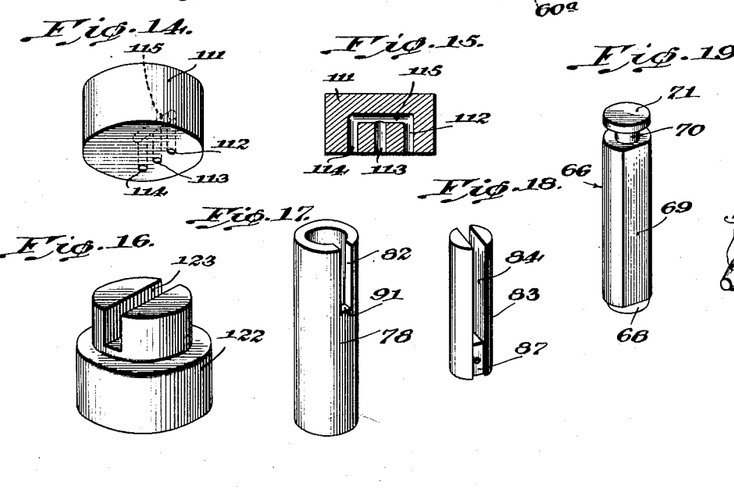
Figure 14 is a detail perspective view of the air distributing valve.
Figure 15 is a cross section of the valve taken on the line 15—15 of Fig. 11.
Figure 16 is a perspective view of a cap to be associated with the distributing valve and forming a connection with the manual setting means.
Figures 17 and 18 are detailed perspective views illustrating a latch sleeve and plunger thereof, respectively.
Figure 19 is a perspective view of the whistle valve plunger.
Figure 20:
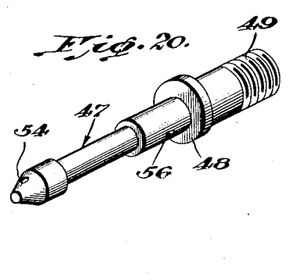
Figure 20 is a perspective view of the piston valve.

A manually operable control valve 111, is provided, which in the present instance is in the form of a circular disk having longitudinal ports 112, 113 and 114, connected by a transverse port 115. The ports 112, 113 and 114 are positioned so as to register with ports 104 to 107, as shown in Figs. 11 to 13, inclusive and thus control passage of air, as will be explained more fully hereinafter.

The valve 111 is oscillatably mounted within a bore 116 of a casing 117, the face of the boss 102 being machined to form a tight fit with an annular flange 118 of the casing 117. The casing is bolted to the cap 30 by suitable machine screws, as indicated at 119.

The casing 117 is provided with external screw threads 120, immediately in advance of the flange 118 which cooperate with screw threads formed in the front face of the casing 17. A lock nut 121 screwed upon the threads 119 and snugly abutting the casing 17 secures the unit 16 within the casing 17.

Figure 9:
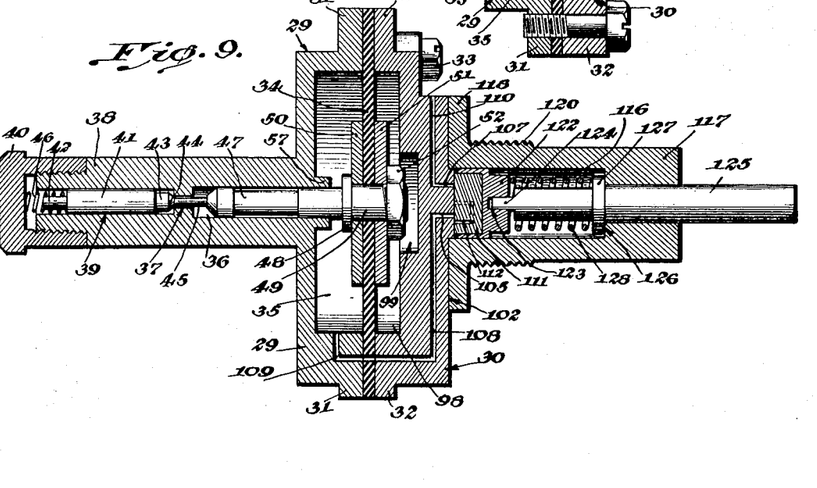
Figure 9 is a cross section substantially on the line 9—9 of Fig. 5.

As clearly shown in Figs. 4, 8 and 9, the valve 111 is mounted within a cap 122 disposed in the bore 116, with the ports 104—107 presented toward the valve face 103. The cap 122 has a transverse slot 123 receiving a tongue 124 of a shaft 125 oscillatably mounted in the casing 117.

The bore 116 of the casing 117 has a shoulder 126 against which a collar 127 formed integrally with the shaft 125 abuts, and between such shoulder and the cap 122 there is positioned a helical spring 128. From the foregoing, it will be seen that the spring 128 maintains the valve 111 in seating engagement upon the seat 103.

A circular plate 129 is secured to the outer end of the casing as at 130 being centrally apertured to permit passage of the shaft 125. An arcuate slot 131 is formed in the plate (see Figs. 4 and 10) adapted to receive a pin 132 formed upon a handle 133 which is keyed to the shaft 125. At a point diametrically opposite the slot 131 the plate 129 has a stud 134 formed upon its rear side, and upon this stud a tension spring 135 is mounted. The spring 135 has a pair of leg members 136 which are crossed and extended downwardly so as to partly encircle the casing 117, the extremities of the legs lying in the path of the pin 132. Thus, when the handle 133 is swung in either a left or right direction, one of the spring legs 136 will be encountered, tensioning such leg, so that upon release of the handle, the spring will return the handle to a neutral position.

The slot 131 is of such length that when the pin 132 reaches the termination thereof, either upon the left or right hand limits thereof, ports between the valve 111 and valve seat 103 will be aligned.

In order to insure delivery of clean dry air to the unit 16, a condenser 137 is installed in the pipe line 58. The condenser may be of any approved construction, but in the present instance I have shown a baffle 138 disposed in the path of the incoming air and a screen 139 across the outlet thereof. For draining the condenser of sediment a screw plug 140 is shown.

The chambers 35 and 98 will be referred to as "fluctuating" and "equalizing" chambers, respectively, in the description of the operation device and in the claims.

The operation

We will assume that the machine is assembled, and that the supply tank pressure is connected to the machine, and that all the parts are in their normal position. At this time the supply valve 41 is on its seat and no air can pass from the supply line 58 into the service line 96. The port 60 in the main body 29 is charged with supply tank pressure, but the port 104 in the valve seat 103 is closed by the valve 111. The dial pointer 24 is at zero. Now to set the machine to a desire pressure, ready for service, the lever 133 is moved to its extreme left hand position, as shown in dotted lines in Fig. 10. In this position the ports 112—113—114 in the face of the valve 111 register with the ports 104—105—106 in the valve seat 103, permitting the air pressure from the supply tank line 58 to pass up through the port 104 and through the port 112, into the transverse port 115 formed in the valve 111, and down through the ports 113—114 through the ports 105—106; and from the port 106 into the equalizing chamber 98. From the port 105 the air passes into the fluctuating chamber 35 (see Fig. 9). As the air passes into the equalizing chamber 98, it also passes on through the port 100 (see Fig. 4) and on through the pipe 23, into the auxiliary air chamber 20 (see Figs. 1 and 4). As the air pressure enters the auxiliary chamber 20 it will cause the pressure gauge pointer to move clockwise on the dial 15, which shows the amount of pressure contained in the auxiliary and equalizing chamber. When the pointer 24 registers or indicates the desired pressure, the lever 133 is released. It will automatically return to normal position by the spring 135 (see Fig. 10).

The purpose of the ports 105—108—109 is to equalize the pressure in the chambers 35 and 98, while the lever 133 is in the left hand position. There is no air connection between these two chambers at any other time. The reason for connecting the chamber 98 with the chamber 35 while the air pressure is being admitted to or raised in the chamber 98 and the auxiliary chamber 20, is to prevent the pressure in the chamber 98 from becoming greater than the pressure in the chamber 35, which would result in putting the machine into operation, the same as if a tire was being inflated. Thus it will be seen that when the lever 133 is in its left hand position, the air pressure from the supply tank line 58 is permitted to pass through the pressure adjusting valve 111 into the chamber 98 and into the auxiliary chamber 20, and into the chamber 35, and on through the port 55 in the valve 47 through the port 53 and from this point into the service line 96, by reason of the port 95 (see Fig. 8). Therefore, it will be seen, that when the lever 133 is in its left-hand position, the air from the supply line 58 feeds into the chambers 35, 98 and 20, and the air pressure in the service line 96 does not pass through the supply valve 41, since the supply valve 41 remains seated while the machine is being set for higher or lower pressures. To release or lower the pressure in the auxiliary chamber 20 and the equalizing chamber 98, the lever 133 is moved to the extreme right hand position. In this position the air passes from the auxiliary chamber 20 through the pipe 23 through the port 100 into the chamber 98, and up through port 106 in the valve seat 103 through the port 112 in the valve 111, into the transverse port 115, down through the port 113 through the port 107 and out through the exhaust port 110 which opens to the atmosphere. This passage of the air causes the pointer 24 to move anti-clockwise on the dial. It will be understood that the pointer is adjusted to any position on the dial by air pressure, and that the pressure is controlled and adjusted by operating the lever 133 which operates the pressure adjusting valve 111.

In this machine, I provide means for greatly increasing the speed of inflation of a tire, this increased speed being obtained by the arrangement of the two chambers 35 and 98 and associated diaphragm, as will now be described. With the diaphragm 34 in normal position the end of the valve 47 is resting against the stem 45 of the supply valve 41, and the port 55 is opened to the chamber 35. The slotted latch plunger 83 is held against the diaphragm washer 50 by the spring 88 and that the heel 90 of the latch is spaced from the shoulder 91. The whistle valve 66 is on its seat. With the parts in their normal position the port 56 is closed by the valve 47, but the port 55 is opened, which connects the air pressure in the service line with the fluctuating chamber 35. When the machine is set for any pressure desired and is at rest, a like pressure exists in the chambers 20, 35 and 98, and in the service line 96. It will therefore be seen that by the least reduction of air pressure in the service line 96 and the chamber 35, which is connected by the ports 53 and 55, results in the diaphragm and its valve moving towards the supply valve 41. The first movement of the diaphragm and its valve will push the supply valve 41 off its seat, to a small extent. This same first movement of the diaphragm would also move the plunger 83 in the same direction. The dog 85 which moves with the plunger 83 will move the end 77 of the lever 74 in the same direction, which would move the other end of the lever 74 in the opposite direction to unseat the whistle valve 66, which permits the air from the chamber 35 to pass through the port 64 and the whistle 61 to the atmosphere. This passage of the air reduces the pressure in the chamber 35 greatly below that contained in the chamber 98, thus causing the diaphragm and its valve to move faster and with more power, in the same direction until the heel of the dog 85 comes in contact with the shoulder 91, which disengages the dog from the lever 74. This allows the whistle valve 66 to seat. At this time the port 55 begins to register with the port 56 so that the pressure in the service line 96, which is now considerably more than that contained in the chamber 98 rushes up through the port 53 and through ports 55—56 into the chamber 35, quickly raising the pressure in the chamber 35 above that contained in the chamber 98. Such action causes the diaphragm 34 and its valve to return to normal position, ready for another stroke, as soon as the excess pressure in the service line 96 passes into a tire.

Figures 6, 7, 10:
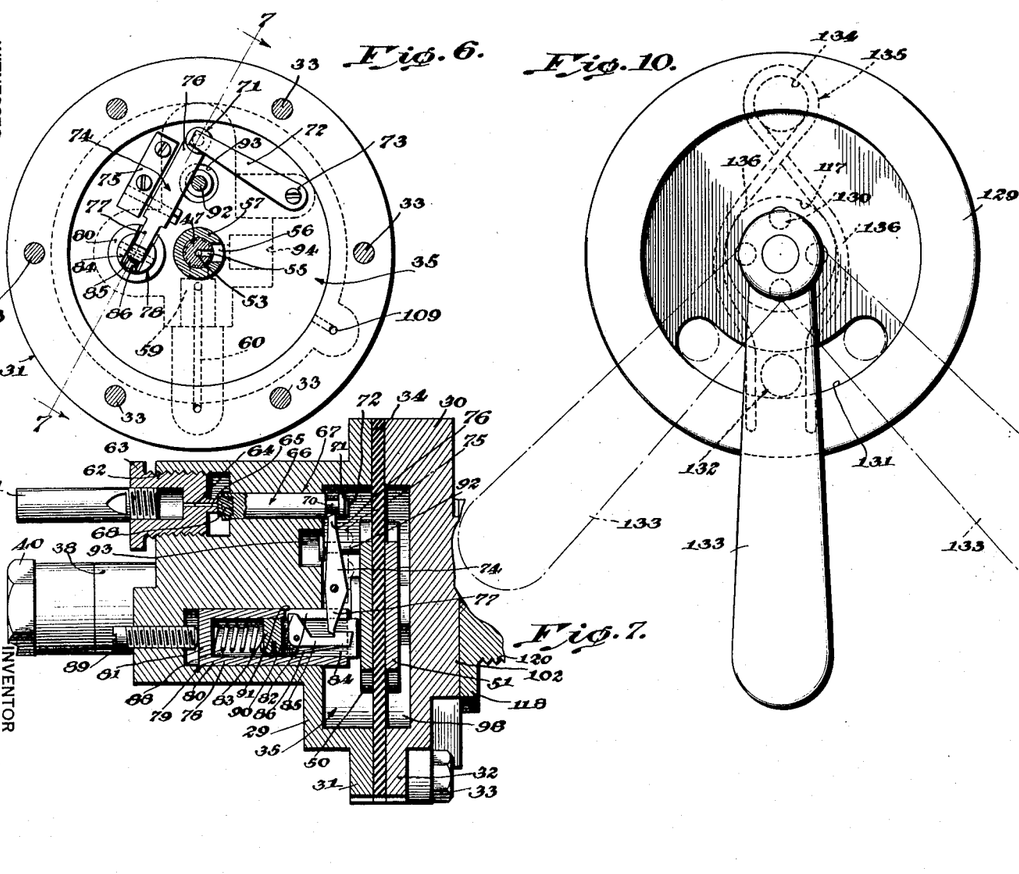
Figure 6 is a cross section on the line 6—6 of Fig. 4.
Figure 7 is a cross section on the line 7—7 of Fig. 6.
Figure 10 is a front elevation of the manual setting means for the apparatus.

Attention is now invited to Figs. 4 and 7 for an understanding of the whistle valve adjustment. The purpose of the block 63, which is threaded into the main body 29, is to adjust the valve 66 so that it will be moved off its seat on the slightest movement of the diaphragm 34 and its valve towards the supply valve 41, as much depends on this whistle valve being unseated at the proper time, as the very first movement of the diaphragm closes the port 56. The further movement of the diaphragm and valve in the same direction, depends on the air in the fluctuating chamber 35 being vented to the atmosphere, which is accomplished by the unseating of the whistle valve 66, to allow the air to pass from the chamber 35. The air passes by means of the flat side 69 of the whistle valve, through the whistle port 64, and through the whistle 61, to the atmosphere. It will be seen that the whistle valve performs three functions: As when inflating a tire it allows air to escape from the chamber 98 to sound an intermittent signal; escapement of air from the chamber 35 causes the machine to work by a series of strokes, which gives the machine the greatest possible speed; and when deflating a tire, this same whistle valve allows the air to escape from the chamber 35, causing a continuous blast of the signal until the tire is deflated down to the pressure at which the machine was set. Thus it will be seen that the movement of the whistle valve at the proper time, to prevent the air from the chamber 98 has much to do with the movements of the other parts of the machines.

I will now explain the operation of the machine when a tire is being inflated. The pointer 24 is set to the desired pressure by the lever 133, as has already been explained. We will say that the pointer is set at 40 lbs. which would mean that there would be 40 lbs. pressure in the equalizing chamber 98, and 40 lbs. pressure in the auxiliary chamber 20. There would also be 40 lbs. pressure in the service line 96 (see Figs. 2 and 4). There might be 150 lbs. pressure, or more, in the supply tank but this makes no difference, as the tank pressure at this time, is entirely separate from the service line pressure by the supply valve 41. Now with all the parts in their normal position and the machine set at 40 lbs. pressure ready to inflate a tire up to that presssure, the tire chuck 13 associated with the service line hose, is placed firmly upon the valve stem associated with the tire to be inflated. If the pressure in the tire is less than that indicated by the pointer 24, the air in the service line 96 would flow into the tire. This would reduce or lower the pressure in the fluctuating chamber 35, through the port 53 and the port 55 in the valve 47 (see Fig. 4). The instant that the pressure in the chamber 35 is reduced below the pressure in the chamber 98, the diaphragm 34 is moved towards the lesser pressure in the chamber 35, and at the same time, the diaphragm washer 50 moves the plunger 83 against its spring 88. The dog 85 is pivoted in the slotted plunger 83, and is held against the end 77 of the lever 74 by a flat spring 86. The whistle valve lever 74 is pivoted as shown, one end of this lever engaging in the groove 70 and the other end is engaged by the dog 85, except when the dog is thrown out of engagement by coming in contact with the shoulder 91. Thus, it will be apparent that on the least movement of the diaphragm 34 towards the chamber 35, the whistle valve 66 is moved off its seat by the lever 74. With the valve 66 unseated, air will escape from the chamber 35 through the whistle 61 to the atmosphere.

A very slight movement of the diaphragm valve 47 crosses or laps the port 55, so there is at this time no connection between the service line pressure and the pressure in the chamber 35. The whistle valve 66 is held off its seat until the port 55 is just about to register with the port 56, but just at this time the diaphragm 34 has flexed, releasing the lever 74 and allowing the whistle valve 66 to seat automatically by the spring 72. It should be remembered that while all these movements of the parts are taking place (which all happen in an instant) the diaphragm 34 has been flexed, because the pressure in the chamber 35 has been greatly reduced below the pressure in the chamber 98, and that the stem 45 has moved the valve 41 from its seat, by encountering the forward end of the valve 47. This action has admitted air from the supply tank into the service line 96, and raised the pressure from the original 40 lbs. to about 80 or 90 lbs., which results in much faster inflation.

Now, just when the supply valve 41 has been pushed almost wide open, the dog 85 is disengaged or tripped and the whistle valve 66 seats. Then on just a little further movement of the valve 47, the small port 55 registers with the port 56. This allows the higher pressure in the service line 96 to rush through the port 53 and through the ports 55 and 56, into the chamber 35. This quickly raises the pressure in the chamber 35 to or above that in the equalizing chamber 98, which forces the diaphragm 34 back to normal position which allows the supply valve 41 to seat. The excess pressure in the service line 96 flows quickly into the tire, even though the pressure in the service line is somewhat lower than that in the chamber 98. The action just described, will, of course start the machine on another stroke, the strokes quickly following one another, until the pressure in the tire has become the same as that contained in the chamber 98.

It will be understood that in an inflating operation, the first movement of the diaphragm 34 is brought about by the reduction of pressure in the service line 96, but a greater and more powerful movement is obtained by venting the air from the chamber 35, to the atmosphere by means of the whistle valve 66. It will be seen that the whistle valve is off its seat while the port 55 is lapped, and that the whistle valve returns to its seat just as the port 55 begins to register with the port 56, so it can be clearly seen that the varying pressure in the service line and the fluctuating chamber sets the diaphragm and associated valve in motion, and that this motion is further and more fully controlled by the whistle valve and the ports 55— 56. This reciprocating movement of the diaphragm in one direction, unseats the supply valve 41 which permits the high pressure from the supply tank to rush into the service line 96, which results in bringing about an alternating pressure in the service line, which greatly increases the speed of inflating a tire.

Considering the deflating operation, we will say that the machine is set at 40 lbs. as previously described, and that a tire which is supposed to need inflating, already has 45 or more pounds of air in it. The chuck 13 on the end of the service line is placed on the valve stem of the tire valve, the valve thereof being unseated by the chuck 13. The pressure in the tire being greater than that in the service line 96 and greater than that in the equalizing chamber 98, the result is, that the air from the tire rushes into and through the service line 96, into the machine. The air from the tire passes up through the port 53 of the valve 47 and out through the small port 55 into the fluctuating chamber 35. This additional air forces the diaphragm 34 towards the chamber 98, and at the same time the headed stud 92 operates the lever 74, which lifts the whistle valve 66 off its seat. From the chamber 35 the excess pressure passes through the valve 66, by reason of the flat side 69, and out through the whistle to the atmosphere, thus causing a continuous blast of the whistle.

When the pressure in the tire has become the same as that in the equalizing chamber 98, the diaphragm 34 and the whistle valve 66 return to their normal positions, and the whistle ceases to function.

When the tire is being inflated, the whistle valve 66 is unseated and seated on each fluctuation of the diaphragm, which causes an intermittent sound of the whistle. When the machine is deflating a tire the whistle valve 66 is unseated by the stud 92, and remains unseated, causing a continuous blast of the whistle, until the pressure in the tire has become the same as that contained in the equalizing chamber 98, or the same as that which the machine is set for.

What is claimed is:

1. In a tire inflating and deflating apparatus, a casing provided with a chamber, a pressure responsive element dividing said chamber into a fluctuating compartment and an equalizing compartment, a valve casing connected with a source of air under pressure, conduits connecting the valve casing with the equalizing compartment and with the fluctuating compartment, a valve in the valve casing for controlling the simultaneous flow of air to the fluctuating compartment and to the equalizing compartment for creating simultaneous equal pressures upon opposite sides of the diaphragm and thereafter cutting off communication between said compartments and the source of air, means for placing the fluctuating compartment in communication with an inner tube thereby lowering the pressure in the fluctuating compartment whereby the diaphragm will flex, a valve operated by the flexing diaphragm to admit air directly to the fluctuating compartment from the source and a valve-controlled audible signal operated intermittently by air from the fluctuating compartment when the diaphragm is flexed.

2. In a tire inflating and deflating apparatus, a casing provided with a chamber, a pressure responsive element dividing said chamber into a fluctuating compartment and an equalizing compartment, a valve casing connected with a source of air under pressure, conduits connecting the valve casing with the equalizing compartment and with the fluctuating compartment, a valve in the casing for controlling the simultaneous flow of air to the fluctuating compartment and to the equalizing chamber for creating simultaneously equal pressures upon opposite sides of the diaphragm and thereafter cutting off communication between said compartments and the source of air, means for placing the fluctuating compartment in communication with an inner tube, thereby lowering the pressure in the fluctuating compartment whereby the diaphragm will flex, a valve for controlling the admission of air directly to the fluctuating compartment from the source, a slidable means connected with the diaphragm for opening the last-mentioned valve and having a passage for conducting the air admitted by this second valve directly to the fluctuating compartment in such quantity as to quickly raise the pressure in the fluctuating compartment, said slidable means being adapted to cut off communication between the passage therein and the fluctuating chamber, an audible signal operated intermittently by air from the fluctuating compartment when the diaphragm is flexed, a valve for controlling the flow of air from the fluctuating chamber to the signal, and means actuated by the diaphragm for opening the audible signal valve after communication has been cut off between the passage in the slidable means and the fluctuating compartment.

3. In a tire inflating and deflating apparatus, a casing having a chamber, a flexible partition dividing said chamber into a fluctuating compartment and an equalizing compartment, a valve casing connected with a source of air under pressure, conduits connecting the valve casing with the equalizing compartment and with the fluctuating compartment, a valve in the valve casing for controlling the simultaneous flow of air to the fluctuating compartment and to the equalizing compartment for creating equal pressures in the two compartments and thereafter cutting off communication between said compartments and the source of air, means connected with the fluctuating compartment for placing said compartment in communication with an inner tube so that when the pressure in the tube is greater than the pressure in the fluctuating chamber the partition will be moved towards the equalizing chamber, a pneumatically operated signal, a conduit connecting the signal with the fluctuating chamber, a valve controlling the flow of air through the last-mentioned conduit to the signal, an operating means for the last-mentioned valve, and means adapted to engage and set the operating means in motion for opening the valve when the partition is flexed towards the equalizing chamber.

4. In a tire inflating and deflating apparatus, a casing provided with a sole chamber, a pressure responsive element dividing said chamber into a fluctuating compartment and an equalizing compartment, means for supplying simultaneously the two compartments with compressed air at the same degree of pressure, means for connecting the fluctuating compartment with the valve stem of an inner tube for supplying the tube with air whereby the pressure in the fluctuating compartment will be lowered and the pressure responsive element will be moved towards the fluctuating chamber, a pneumatically operated signal actuated periodically by the compressed air in the fluctuating chamber, a valve for controlling the flow of air to the whistle, a spring-pressed plunger, a dog pivotally mounted in the plunger, a pivotally mounted lever having one end engageable with the valve and the other end engageable with the dog for retaining the valve normally closed, one end of the plunger being located adjacent the responsive element so that when said element is moved the plunger will be reciprocated for rocking the dog and lever to open the valve to the signal, and means actuated by the moving responsive element for admitting air under pressure from the source.

5. In a tire inflating and deflating apparatus, a source of compressed air, a casing having a chamber, a diaphragm dividing the chamber into an equalizing compartment and a fluctuating compartment, means for causing the two compartments to be supplied with air under pressure from the source, adjustable means for limiting the pressure to which said equalizing compartment is to be ultimataely charged and the fluctuating compartment is to be initially charged, a pneumatically actuated signal, means for causing said signal to be operated by air from the fluctuating compartment and including a fixed cylinder having a shoulder, a plunger in the cylinder, a spring for urging the plunger outwardly of the cylinder to be engaged by the diaphragm when said diaphragm is flexed by lowering of pressure in the fluctuating compartment, a dog pivoted on the plunger and having a heel engageable with the shoulder for rocking said dog, a valve for controlling the flow of air to the signal, and means between the valve and dog and adapted to be oscillated when the dog is rocked for moving the last-mentioned valve to open communication between the signal and the fluctuating compartment.

WILLIAM A. HARRIS.